US006978931B2

(12) United States Patent
Brobeck

(10) Patent No.: US 6,978,931 B2
(45) Date of Patent: Dec. 27, 2005

(54) ENERGY CREDIT CARD SYSTEM

(76) Inventor: William I. Brobeck, 1125 Bollinger Canyon Rd., Moraga, CA (US) 94556

( * ) Notice: Subject to any disclaimer, the term of this patent is extended or adjusted under 35 U.S.C. 154(b) by 0 days.

(21) Appl. No.: 10/824,044

(22) Filed: Apr. 13, 2004

(65) Prior Publication Data

US 2004/0206813 A1 Oct. 21, 2004

Related U.S. Application Data

(60) Provisional application No. 60/463,754, filed on Apr. 17, 2003.

(51) Int. Cl.[7] .......................... G07B 15/02; G06F 7/08

(52) U.S. Cl. ...................................... 235/384; 235/381

(58) Field of Search ............................... 235/380, 383, 235/381, 375, 384; 60/641.11, 398; 126/629, 126/643

(56) References Cited

U.S. PATENT DOCUMENTS 4,103,493 A * 8/1978 Schoenfelder .......... 60/641.11
6,718,761 B2 * 4/2004 Merswolke et al. .......... 60/398
2002/0144503 A1 * 10/2002 Merswolke et al. .......... 60/398
2005/0074665 A1 * 4/2005 Spaziante et al. ............ 429/50

* cited by examiner

*Primary Examiner*—Thien M. Le
(74) *Attorney, Agent, or Firm*—Bruce H. Johnsonbaugh

(57) ABSTRACT

A method of providing an energy credit system is disclosed for providing redeemable energy or mass transit credits to consumers who contribute power to a shared electric power grid wherein the excess power generated by each consumer to the power grid is measured and energy credits are awarded to those consumers who contribute power to the power grid. Each consumer receiving energy credits is allowed to redeem those credits by acquiring fuel, power or mass transit tickets. In one embodiment of the invention, a separate energy brokerage house is provided which receives compensation from the operator of the power grid for power provided to the grid by the consumers and compensates the fuel or energy provider or mass transit system for the energy credits redeemed by each consumer. In a second embodiment, the operator of the power grid compensates the providers of fuel, energy or mass transit directly for the redeemed energy credits.

3 Claims, 4 Drawing Sheets

ENERGY CREDIT CARD SYSTEM

CROSS-REFERENCE TO RELATED APPLICATION

This application claims the benefit of and priority from U.S. provisional application Ser. No. 60/463,754 filed Apr. 17, 2003.

BACKGROUND AND BRIEF SUMMARY OF INVENTION

The need for renewable energy sources in the United States is monumental and is growing more acute. The present invention provides a system wherein consumers install solar systems, for example, and deliver excess electric power to a shared power grid. The consumer receives "energy credits" in exchange for excess power delivered to the grid. Those "energy credits" may be redeemed by the customer in several ways. For example, the customer may redeem the credits by purchasing gasoline or heating oil or mass transmit tickets. The gasoline, heating oil or mass transmit tickets are paid for by an Energy Credit Card Company in one embodiment of the invention. In a second embodiment, the payment for fuel or tickets is made by the operator of the electric power grid.

A primary object of the invention is to provide an energy credit system to stimulate and expand the use of renewable energy sources by consumers.

Another object of the invention is to provide an energy credit system wherein consumers who deliver excess power to the power grid receive credits which may be redeemed by the purchase of fuel, power or mass transit tickets.

Other objects and advantages of the invention will become apparent from the following description and drawings wherein:

DETAILED DESCRIPTION OF THE DRAWINGS

Figure 1:
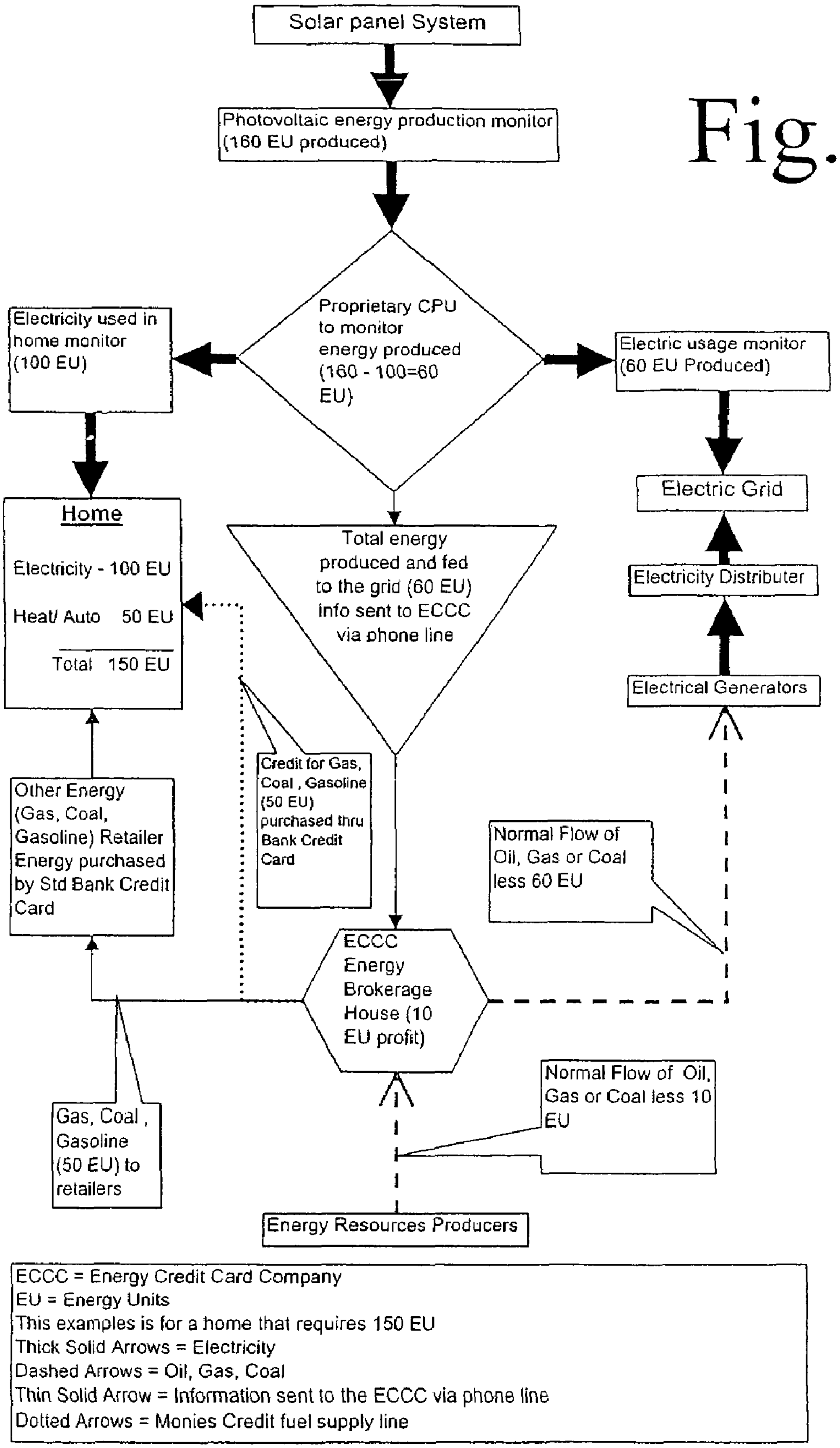
FIG. 1 is a flowchart of the first embodiment of the invention wherein an Energy Credit Card Company records energy credits and pays the fuel provider or mass transmit system for credits redeemed by the consumer.

The purpose of this invention is to promote a virtually limitless production of electricity (or any other form of energy) by encouraging consumers to acquire solar power systems (or other renewable energy source) and to give the consumer credit in other forms of energy consumed or credits for mass transit fares and to reduce the payback period for the investment in the photovoltaic (or other energy producing) system.

Two separate embodiments are disclosed herein. The first embodiment (FIG. 1) includes an Energy Credit Card Company (ECCC) which acts as an energy brokerage house. The second embodiment (FIGS. 2–4) does not require an ECCC, but rather expands the responsibilities of the operator of the electric power grid as described below.

The invention includes a device which records the amount of energy produced by a photovoltaic (or other) system, the amounts used by the consumer and the amount of excess energy or power flowing from or back into the electricity grid. Currently, the energy distributor sends a "meter reader" to the residence or business and records the energy used every month. This invention would allow for the installation of an additional meter located in such a way as to measure the excess energy produced by the photovoltaic system and transferred to the shared electric power grid. The meter reader would record both and in one embodiment the electricity distributor would send the results to the ECCC. An improvement over manually reading each set of meters is by replacing the meters with a remote energy-recording device (RERD). The device measures the energy by multiplying the measured current by the measured voltage at each of the three points. The amount of energy produced or consumed by the user and the photovoltaic system is determined by the following simple formula:

Photovoltaic Energy Produced−Energy used=Excess power returned to grid

Since the energy consumed by the public is time dependent, such as peak and off-peak times, the RERD measures and records on a continuous basis. For instance, during peak times, the RERD would record perhaps every 5 to 10 minutes and during the night, the RERD would record every 30 to 60 minutes.

The RERD and accompanying software interfaces with a standard computer to

1. Allow the user to graphically see the benefits in real time
2. To configure the RERD
3. To send energy usage data to the ECCC
4. To correspond with the ECCC
5. Check the users energy credit balance
6. To set up ways to receive credit from other energy providers For those users who are not computer literate or do not want their computer tied to the RERD directly, configuration would be accomplished via the telephone menu system. The user could call at any time to reconfigure the RERD. When the RERD called in to send the daily data, the new configuration would be sent to the RERD.

In addition, a simpler net metering system measuring the excess power generated and supplied to the power grid could be installed. More specifically, instead of the more complex power-measuring device described earlier, a single remote net metering device could be installed. It would still send power consumed or produced information to the RERD at intervals set by the consumer.

The novel business method aspect of this invention in one embodiment is the relationship between the consumer, the ECCC and the oil companies or energy providers. After the consumer sets up the equipment and an account with the ECCC, the RERD will begin sending records to the ECCC. The ECCC will then issue a credit. This credit can be in any number of forms such as:

1. Cash value
2. Energy equivalents in other forms of energy such as gasoline or propane or natural gas The ECCC will issue these credits on a percentage basis. For instance, if the user produces $100.00 of energy, the ECCC would issue a $70.00 credit and pocket $30.00 profit. The actual profit might follow current credit card company guidelines. Since the ECCC is tied to an energy brokerage house, the ECCC can issue credit to the consumer in those various ways mentioned above.

FIG. 1 is a flowchart illustrating the above. FIG. 1 illustrates a specific example of the invention wherein a consumer installs a solar panel system at his home. The energy is described in terms of "Energy Units" or simply EU. When the solar panel system generates more electricity (i.e. 160 EU) than used by the consumer's home electrical needs (i.e. 100 EU), the excess electricity (60 EU) is measured and provided to the electrical grid. According to the present invention, 50 EU of the 60 EU excess electricity provided to the grid is "credited" to the account of the specific consumer. The credited amount is in effect an energy credit card usable by the consumer to purchase non-electrical forms of energy, i.e., natural gas, gasoline, heating oil, etc. The remaining 10 EU of the excess energy is transferred as profit to the Energy Credit Card Company (ECCC).

The ECCS is designed to allow the user to conduct his/her life without any extra effort. If the user wished to use the Excess Energy Credit (EEC) for gasoline, the user simply charges the gasoline to his/her bank credit card. The charges are sent from the gas station to the credit card company along with a tag identifying it as an approved fuel. Before sending the user the monthly statement, the credit card company checks the ECCC for any credits the user may have. If credits do exist, the ECCC issues those credits to the credit card company. The balance is paid by the user.

Energy companies such as Texaco, Shell, Chevron or BP may offer credit cards with more incentives. The ECCS should be setup to handle these types of transactions. These types of incentives would be the result of barter negotiations with each company.

Figure 2:
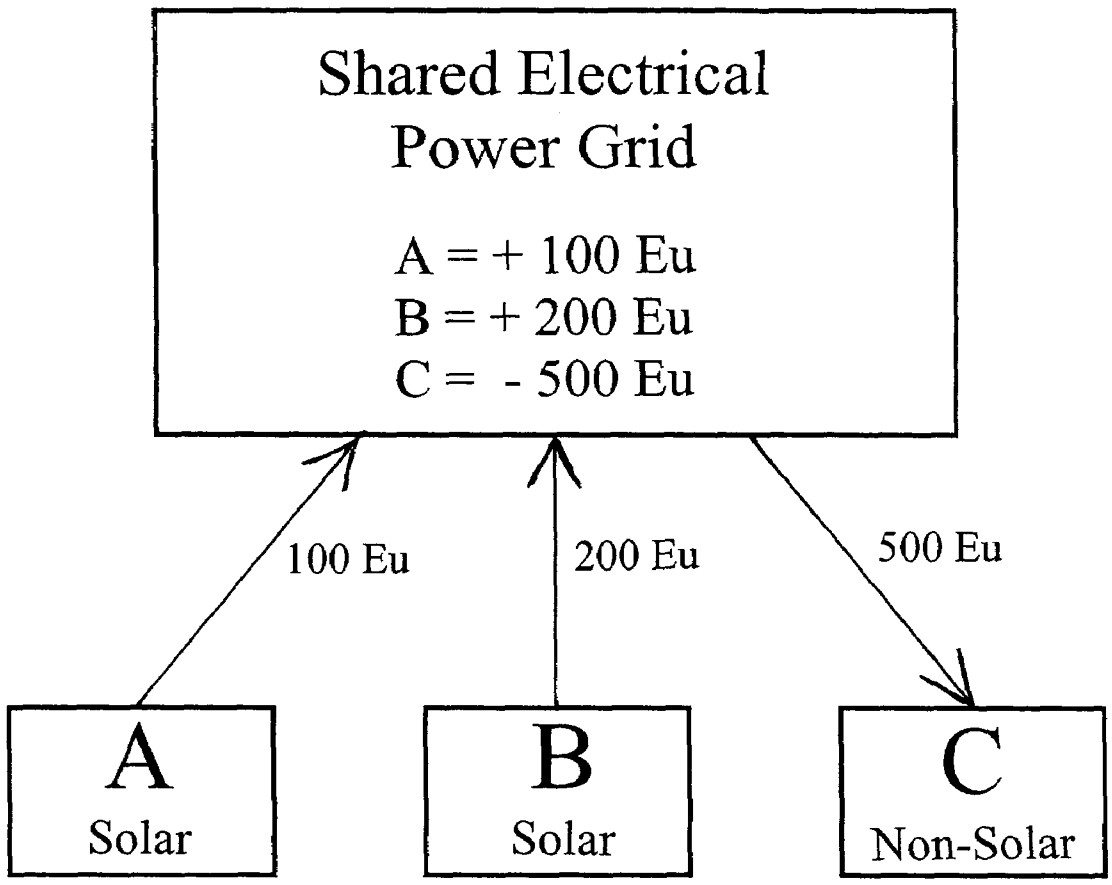
FIGS. 2–4 are schematic flowcharts of a second embodiment wherein the operator of the power grid records the energy credits earned by consumers and pays the fuel provider or mass transit system for purchases made by consumers with earned energy credits.

FIG. 2 illustrates the first step of a second embodiment of the invention. Three consumers A, B and C are connected to a shared power grid. A and B have solar power renewable energy sources, but consumer A delivering 100 EU of excess power to the grid, B delivering 200 EU, and C consuming 500 EU from the grid. The operator of the grid records these energy transfers. A and B have redeemable energy credits.

Figure 3:
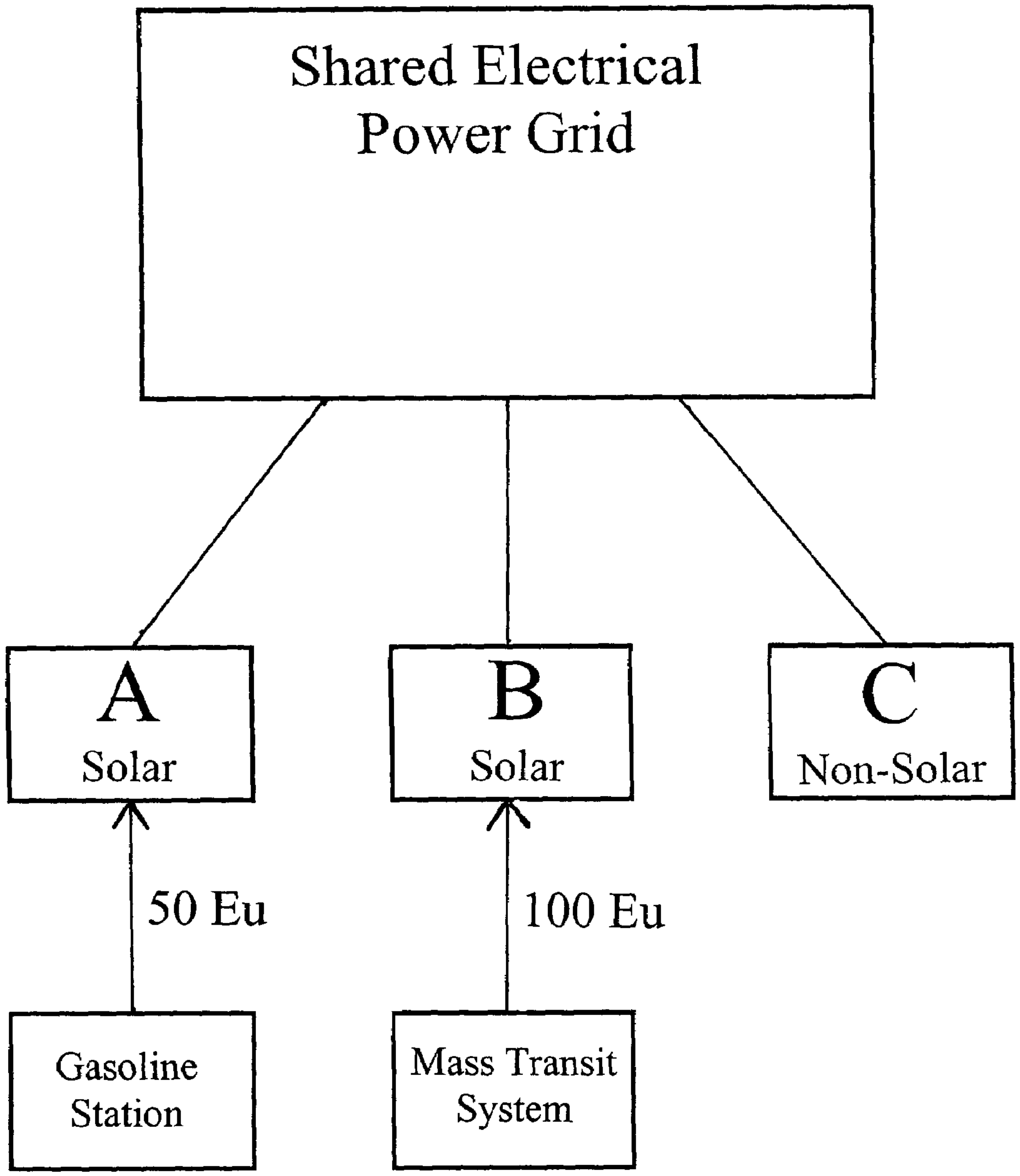

FIG. 3 illustrates consumer A purchasing 50 EU worth of gasoline, to be paid for with A's accumulated energy credits. Consumer B is shown in FIG. 3 to be purchasing 100 EU worth of mass transit tickets, to be paid for with B's accumulated energy credits.

Figure 4:
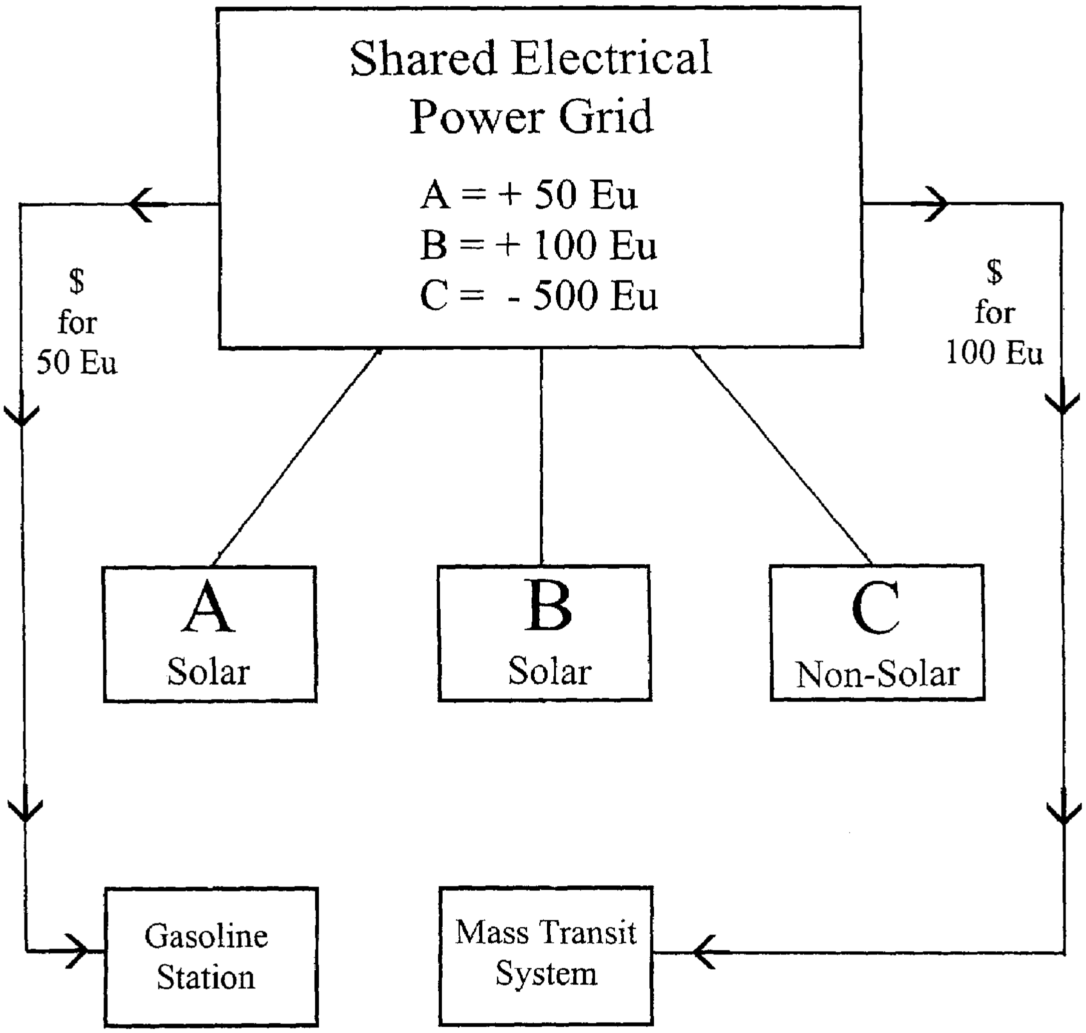

FIG. 4 illustrates payment for the purchases made by A and B. The operator of the power grid pays the gasoline provider for A's purchase of 50 EU of gasoline. A's energy credit balance is reduced from +100 EU to +50 EU. The operator of the power grid also is shown paying for B's purchase of 100 EU worth of mass transit tickets. B's energy credit balance is shown as reduced from +200 EU to +100 EU. C's account remains constant at −500 EU until C pays his power bill to the operator of the grid.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method of providing an energy credit system for providing redeemable electrical or non-electrical energy credits or mass transit credits through an energy brokerage house to consumers who contribute power to a shared electric power grid whereby a plurality of consumers are each separately connected to a shared electric power grid, and wherein at least some of said consumers have their own, local renewable energy source connected to said power supply grid, comprising the steps:

measuring the excess power generated by each consumer's energy source which is fed into said electric power grid, awarding energy credits, redeemable as either electrical energy, non-electrical energy, cash value or mass transit tickets, to each of said consumers in relation to the excess power contributed to the electric power grid by such consumer, recording said awarded energy credits at an energy brokerage house, allowing each consumer receiving said energy credits to redeem those energy credits by acquiring fuel, power or mass transit tickets from a fuel or power provider or from a mass transit system, and requiring said energy brokerage house to compensate said fuel or energy provider or mass transit system in direct relation to the energy credits redeemed by each said consumer.

2. The method of claim 1 comprising the further step:

requiring the operator of said power grid to compensate said energy brokerage house for said excess power generated by said consumers.

3. The method of claim 2 comprising the further step:

allowing said energy brokerage house to retain as profit a portion of said compensation received from the operator of the power grid.

* * * * *